Jan. 7, 1941.    J. HUTCHINSON    2,228,137
DISPLAY SIGN
Filed June 17, 1939    5 Sheets-Sheet 1

WITNESSES

INVENTOR
Job Hutchinson
BY
ATTORNEYS

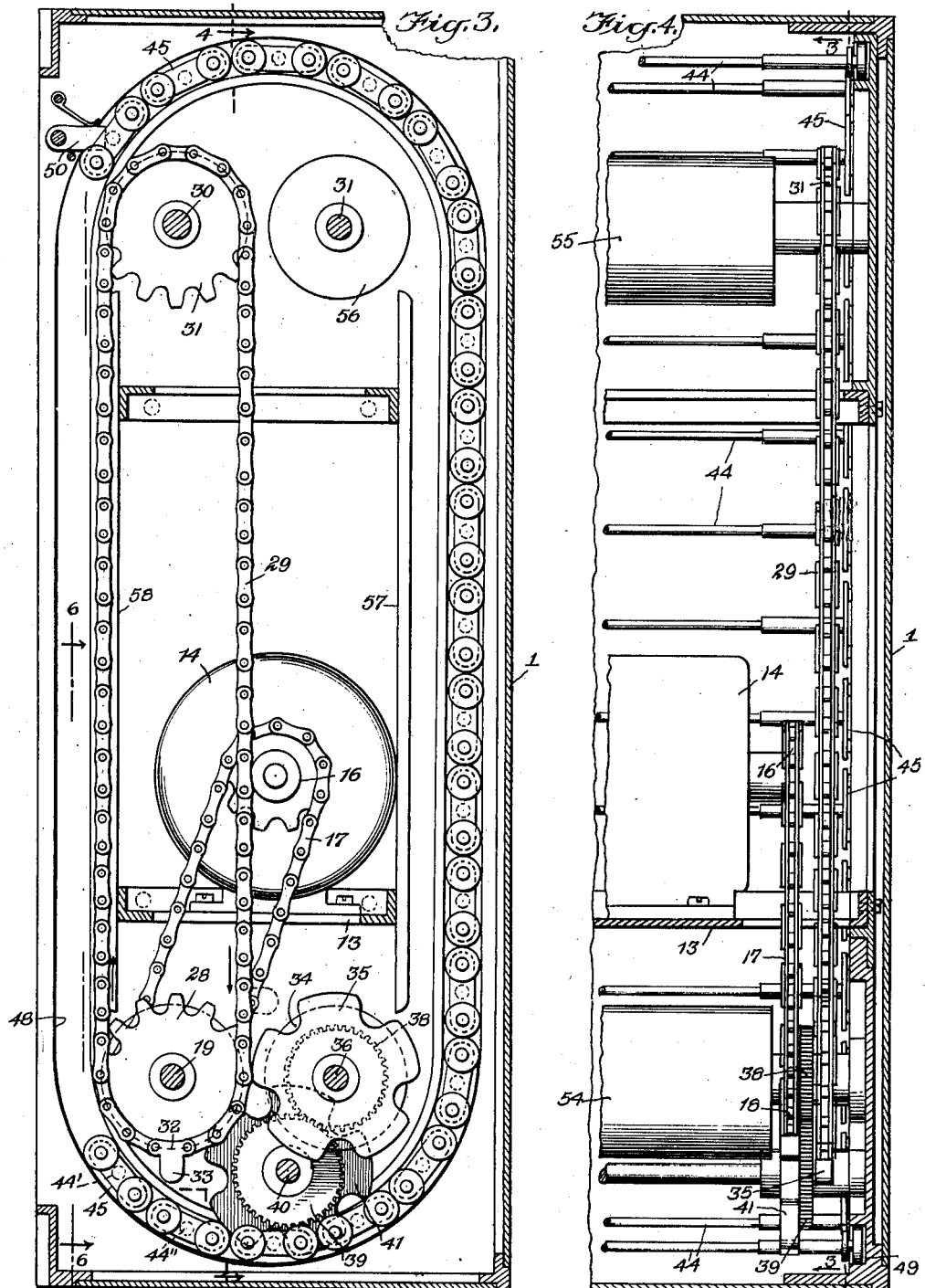

Jan. 7, 1941.   J. HUTCHINSON   2,228,137
DISPLAY SIGN
Filed June 17, 1939   5 Sheets-Sheet 3

INVENTOR
Job Hutchinson
BY
Munn, Anderson & Liddy
ATTORNEYS

WITNESSES

Jan. 7, 1941.  J. HUTCHINSON  2,228,137
DISPLAY SIGN
Filed June 17, 1939  5 Sheets-Sheet 4
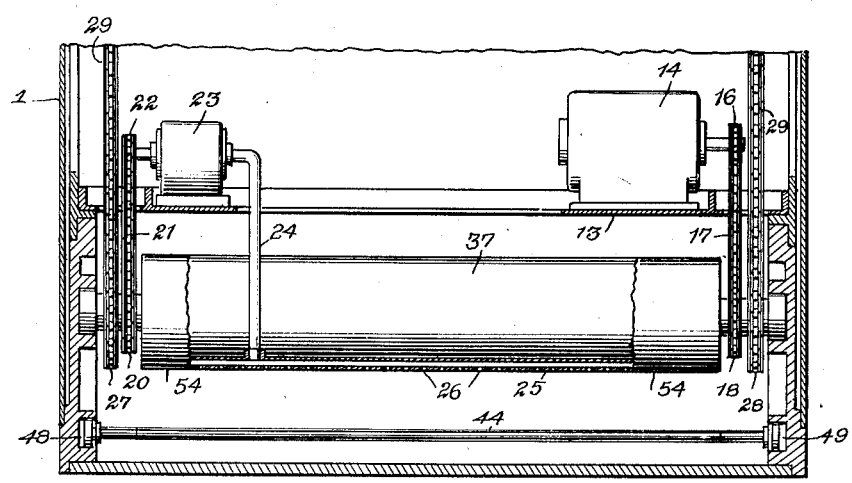
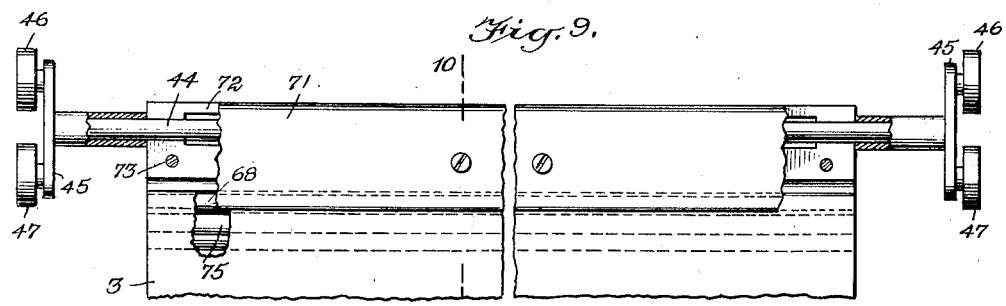
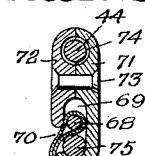
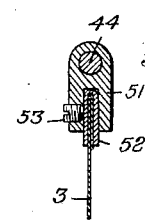
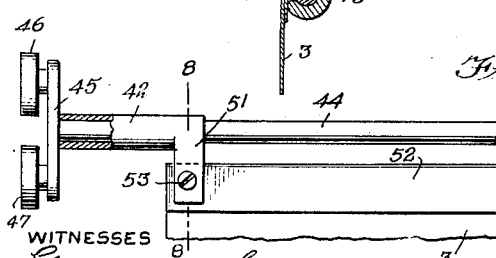
WITNESSES
Geo. W. Naylor
A. L. Kitchin
INVENTOR
Job Hutchinson
BY
Munn, Anderson & Liddy
ATTORNEYS Jan. 7, 1941. J. HUTCHINSON 2,228,137
DISPLAY SIGN
Filed June 17, 1939 5 Sheets-Sheet 5

Patented Jan. 7, 1941

2,228,137

UNITED STATES PATENT OFFICE 2,228,137

DISPLAY SIGN

Job Hutchinson, Great Neck, N. Y., assignor to Visual Merchandiser, Inc., New York, N. Y., a corporation of New York Application June 17, 1939, Serial No. 279,645

10 Claims. (Cl. 40—36)

This invention relates to display signs and has for an object to provide an improved simple construction wherein a large number of display members or sign sheets may be brought successively to view and then the action repeated once or a number of times.

Another object of the invention is to provide a display sign which is formed to display comparatively large display sign sheets in a comparatively small casing or enclosure.

An additional object is to provide a construction for successively bringing to view sign sheets and then maintaining the sign sheets stationary for a predetermined time.

A further object of the invention is to provide a display sign which is comparatively small and provided with a comparatively large sign opening through which the display sign sheets may be seen when the device is functioning.

In the accompanying drawings—

Fig. 3 is a sectional view through Fig. 4 approximately on the line 3—3 and illustrating in side elevation the various moving parts of the device;

Fig. 4 is a sectional view through Fig. 3 approximately on the line 4—4;

Fig. 6 is a fragmentary sectional view through Fig. 3 approximately on the line 6—6;

Fig. 7 is a fragmentary view showing one end of one of the sign sheets together with the carrier rod associated therewith;

Fig. 8 is a fragmentary sectional view through Fig. 7 approximately on the line 8—8;

Fig. 9 is a view similar to Fig. 7 but showing a slightly modified construction;

Fig. 10 is a fragmentary transverse sectional view through Fig. 9 approximately on the line 10—10;

Referring to the accompanying drawings by numerals, 1 indicates a housing or casing which may be made of wood or other material or a combination of materials. The housing 1 is provided with a sight opening 2 through which one of the sign sheets 3 is adapted to be seen. It will be understood that except during the movement of the sign sheets only one sign sheet may be seen through the sight opening 2.

Figure 2:
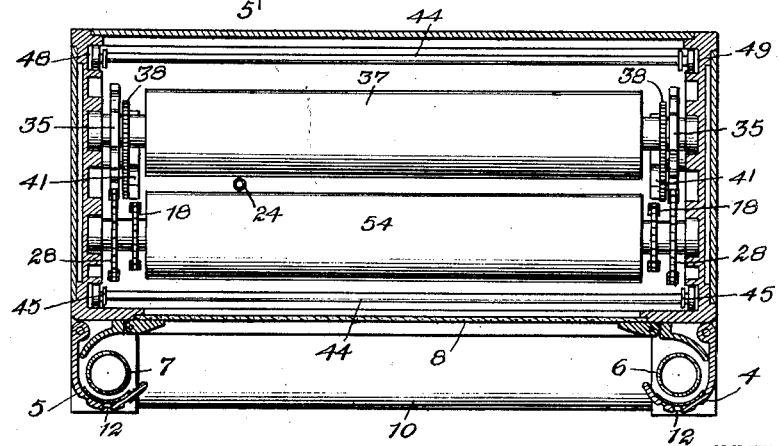
Fig. 2 is a sectional view through Fig. 1 approximately on the line 2—2.

In forming the casing 1, there are provided arc-shaped hoods 4 and 5, as illustrated in Fig. 2. Elongated lamps 6 and 7 are arranged in these hoods so as to illuminate the various sign sheets 3 as they pass the sight opening. The sight opening 2 is provided preferably with a transparent closure member 8 so as to prevent dirt and dust from entering the interior of the casing. The hoods 4 and 5 extend from near the top to near the bottom of the casing 1 and similar hoods 9 and 10 extend across the top and bottom except for the various corner pieces 11. All these hoods are provided with apertures 12, whereby the light from the lamps 6 and 7 may shine therethrough and present an ornamental and pleasing illuminated frame. If desired, colored sheets of paper, Celluloid, or other partly transparent material may be arranged within the various hoods over the apertures so that the light shining therethrough will be colored and thereby present a more pleasing appearance.

Figure 5:
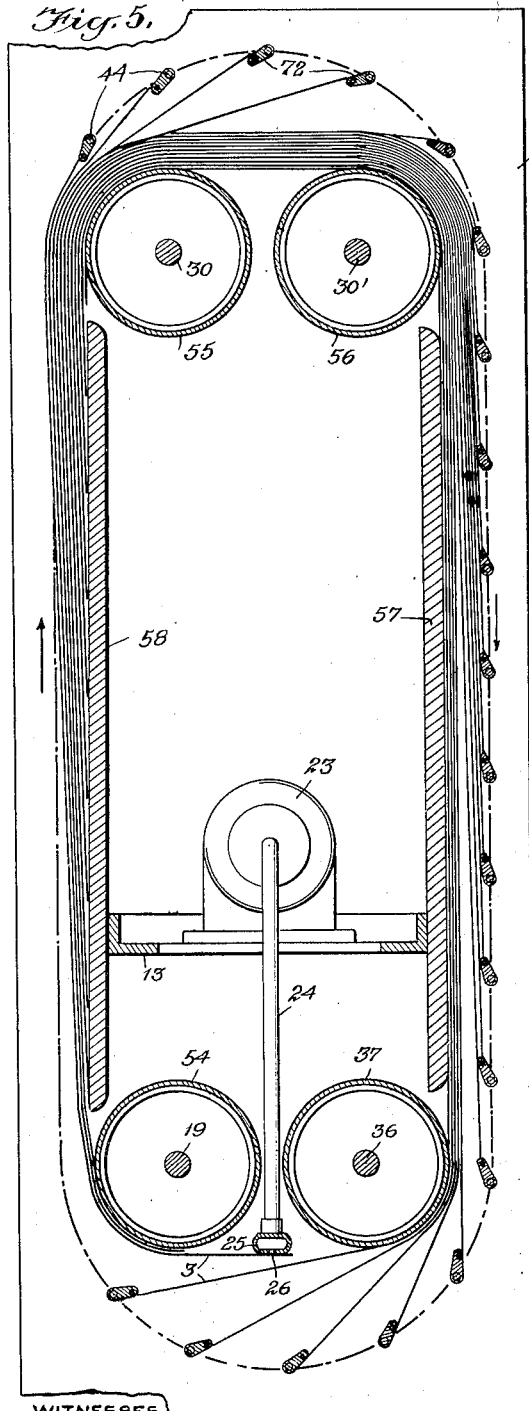
Fig. 5 is a sectional view through Fig. 1 approximately on the line 5—5, the same being on an enlarged scale and most of the moving parts removed in order to better illustrate the position and action of the sign sheets.

Arranged within the casing 1 is a platform 13, as shown particularly in Figs. 3 and 5, and on this platform there is provided an electric motor 14 which is electrically connected with a terminal socket 15. The lamps 6 and 7 are also connected to this socket so that current may be readily supplied to the lamps and to the motor at the same time. If desired, a separate switch could be arranged in the light circuit and in the motor circuit though ordinarily this is not necessary. The motor 14 is provided with a sprocket wheel 16 on which is mounted a sprocket chain 17. The chain 17, as illustrated particularly in Fig. 6, passes over a sprocket wheel 18 rigidly secured to shaft 19, whereby this shaft is rotated whenever motor 14 is functioning. Preferably the sprocket wheel 18 is of greater diameter than the sprocket wheel 16 so that there will be a reduced speed of shaft 19 though this is not essential. A second sprocket wheel 20 is secured to shaft 19 and actuates a chain 21 which passes over a sprocket wheel 22 secured to a pump 23 for actuating the pump.

Pump 23 is an air pump and produces suction or rarefaction in a pipe 24. The pipe 24 is in continuous communication with a flattened pipe or chamber 25 over which the various sign sheets 3 pass. Whenever the device is functioning there will be a rarefaction in the chamber 25 and as this chamber has a row of apertures 26 the various sign sheets are caused to adhere to or hug rather closely the chamber 25. When the parts are in the position shown in Fig. 5, the suction or rarefaction will hold the free end of one of the sign sheets 3 tightly against the chamber 25. When the next sign sheet is brought around and pulled upwardly the sign sheet in contact with chamber 25 will remain as shown in Fig. 5 until the next succeeding sign sheet gets in position in back of the sight opening 2 and moves the previous sign sheet, whereupon the suction in chamber 25 will function to draw the free end of the succeeding sign sheet to the position shown in Fig. 5. As the sign sheets successively move, the free ends will be successively attracted and brought to a position against chamber 25 so that they will not move until positively pulled from above as hereinafter fully described.

Sprocket wheels 27 and 28 are rigidly secured to shaft 19 near the respective ends of the shaft and these sprocket wheels each accommodate a chain 29. At the end of the casing there is provided a shaft 30 on which a pair of sprocket wheels 31 are mounted and positioned to receive the respective chains 29. The sprocket wheels 31 act as idlers while the sprocket wheels 27 and 28 act as driving sprockets. Each of the chains 29 is provided with a special link 32 having a lug 33 adapted to move into the various notches 34 in succession for rotating the notched wheel 35. As there are five notches in the wheel 35, on each complete travel of the link 32 wheel 35 will be moved one-fifth of a revolution. It will be understood that there is a notched wheel 35 adjacent each end of the shaft 36 to which it is rigidly secured. Roller 37 is also secured to the shaft 36 and the respective gear wheels 38. The respective gear wheels mesh with respective pinions 39, which pinions are rigidly secured to a shaft 40. Shaft 40, adjacent each end, carries a notched wheel 41 positioned so that as it is rotated the respective sleeves 42 and 43 (Fig. 7) move into the notches so that this wheel acts as a feed wheel. As there is a feed wheel 41 for each of the sleeves 42 and 43, these sleeves will be moved forwardly the same distance at the same rate of speed. As illustrated in Fig. 7, the sleeves 42 and 43 are rotatably mounted on a shaft 44. Each sleeve just mentioned carries a plate 45 which, in turn, carries rollers 46 and 47 adapted to travel in the respective guiding channels 48 and 49. These guiding channels are arranged on opposite sides of the casing 1 and face each other as shown in Fig. 2. The guiding channels at the top and bottom are arcuate, one leg of each channel being arranged adjacent the sight opening 2, whereby the various sign sheets 3 are brought to a position near the sight opening for display. It will be understood that the various rollers 46 and 47, together with the shaft 44 and associated parts, are loosely or freely positioned in the runways 48 and 49. As shown in Fig. 3, most of the rods 44 and associated members are arranged in the right-hand run and, consequently, the weight of these parts would have a tendency to force the first one upwardly, but in view of the respective wheels 41 this cannot be done.

As shown in Fig. 3, the shafts 44' and 44" are free but there is no tendency for these shafts to move upwardly, because wheels 41 hold back all the prior groups of shafts and associated parts. However, when the lugs 33 on the special links 32 engage shafts 44', for instance, this shaft and all parts connected therewith will be moved upwardly across the sight opening until the lug 33 slips off the shaft 44' at the top. At this time the spring-pressed pawl 50 will engage the shaft 44' and prevent its return.

Figure 1:
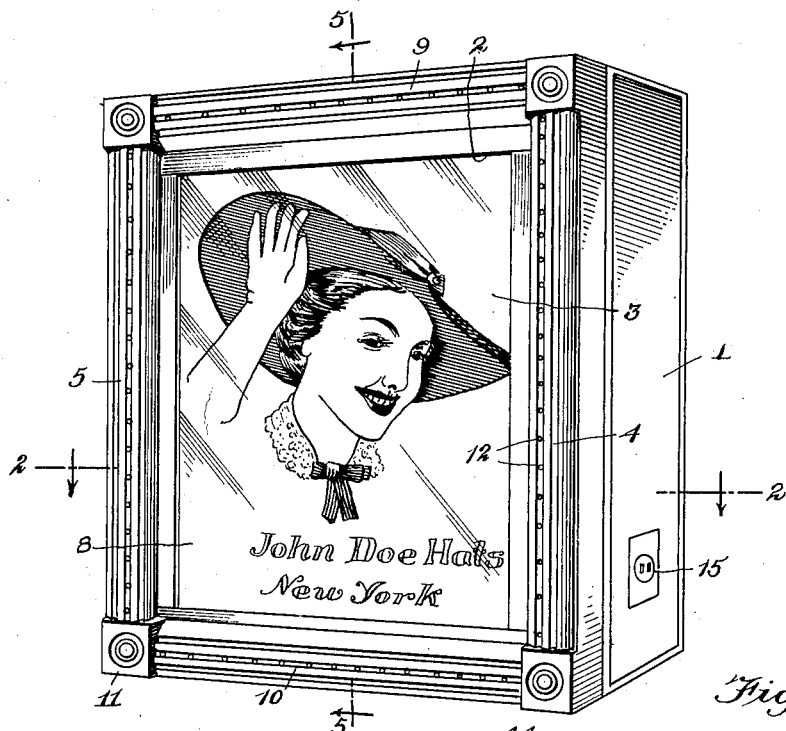
Fig. 1 is a perspective view of a display sign disclosing an embodiment of the invention.

From Fig. 7 it will be observed that the sleeves 42 and 43 are provided with bifurcated extensions 51 into which the reinforced edge 52 of the sign sheet 3 is placed and a suitable set screw 53 for each of the members 51 is provided. These set screws clamp the edge 52 firmly in place. The sign sheet 3 may be paper, cloth, or a combination, or any other flexible material, and the advertising and display members are mounted on the respective sign sheets as illustrated in Fig. 1. These display members may be printed or painted and held on the sheets 3 in any desired manner. Preferably the parts are painted or printed on the sign sheets so as not to present an undesirable thickness.

The respective lugs or extensions 33 on the special links 32 really engage the sleeves 42 and 43 rather than the shaft 44 but act to raise the sign sheet as just described. The various shafts 44 are rotatably mounted in the sleeves 42 and 43 and are rigidly secured to the respective plates 45, whereby the shafts may freely turn as the sign sheet is pulled.

From Fig. 5 it will be observed that a drum or roller 54 is rotatably mounted on shaft 19, while rotatable rollers or drums 55 and 56 are rotatably mounted on the respective shafts 30 and 30'. Between these rollers there are provided guiding plates 57 and 58 (Fig. 5), said guiding plates being preferably connected with the platform 13. The various rollers just described permit the ready movement of the various sign sheets in an almost rectangular path. It will be observed that each of the sign sheets is connected to the shaft 44 at one end and at the opposite end is free. Because of this fact the rarefaction chamber 25 is important as it acts to hold the respective free ends of the various sign sheets against movement until the proper time.

When all the parts are in proper functioning position it is only necessary to connect the device with a supply of current and the motor will begin to function. The various moving parts associated with the motor will also begin to function and successively move the sign sheets to a position opposite or in back of the sight opening 2 and will allow the sign sheets to remain in this position for a predetermined time and then produce a second movement. After all the sign sheets have been exposed the action is automatically repeated unless the current is turned off.

Figure 11:
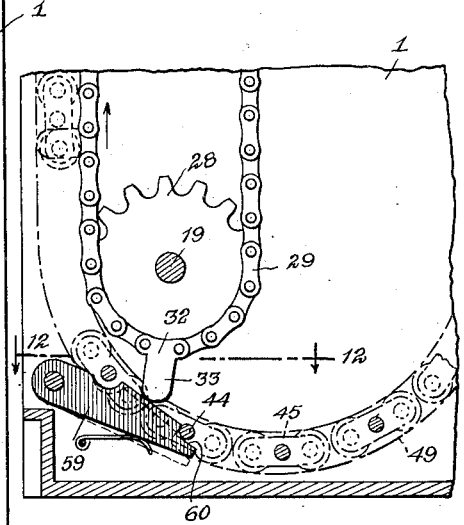
Fig. 11 is a view similar to the lower part of Fig. 3 but showing a modified form of catch and feeding mechanism.
Figure 12:
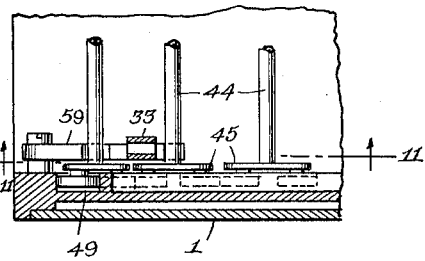
Fig. 12 is a fragmentary sectional view through Fig. 11 on the line 12—12.

Instead of using the notched wheels 35 and 41, as shown in Fig. 3, a modified construction as shown in Figs. 11 and 12 might be used. In these two figures there is shown a spring-pressed pawl 59 adjacent each side of the casing. This pawl is provided with a notch 60 adapted to engage a shaft 44 and prevent the movement of the succeeding shafts under the action of gravity. When the chain 29 functions to bring the extension 33 of link 32 to the position shown in Fig. 1 and then to a further position, the end of the extension 33 will depress the pawl 59 so as to disengage the same from the shaft 44, whereupon the various shafts 44 may move forwardly but only to the extent of one shaft 44 and associated parts as the extension 33 will move the preceding shaft 44 and, at the same time, move away from pawl 59, whereupon this pawl will catch the next shaft 44. It will therefore be seen that each time the extension 33 moves to its lowermost position, it will shift the pawl 59 and then start to pull a new sign sheet.

Figure 13:
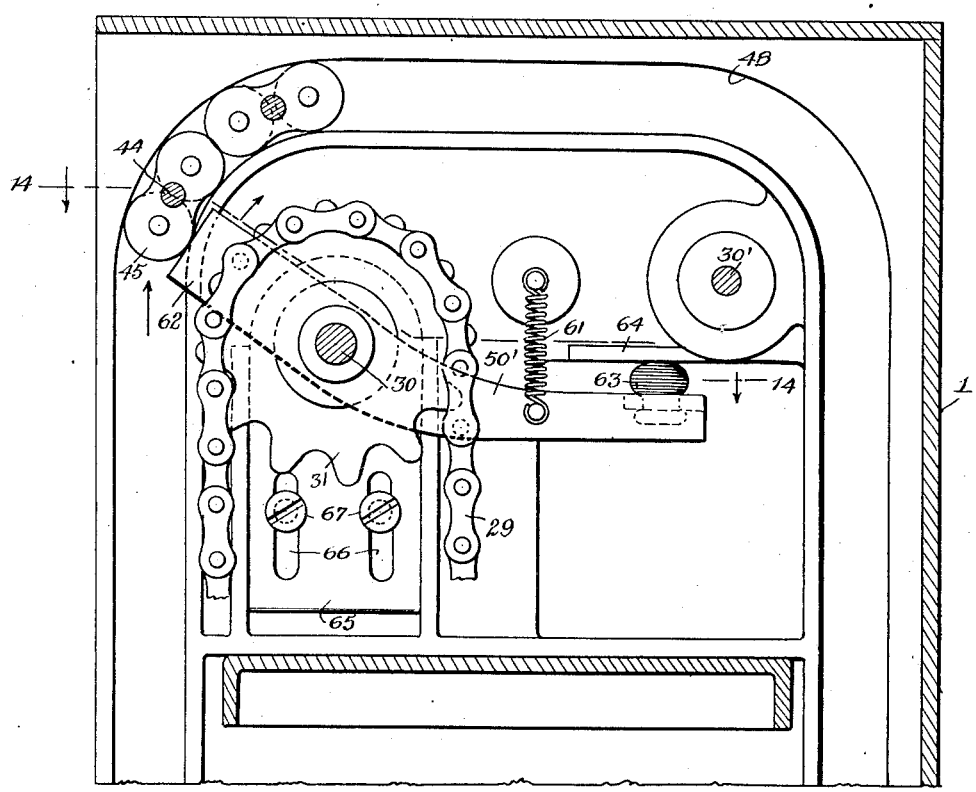
Fig. 13 is a view similar to the upper part of Fig. 3 but showing a modified form of catch and associated parts.
Figure 14:
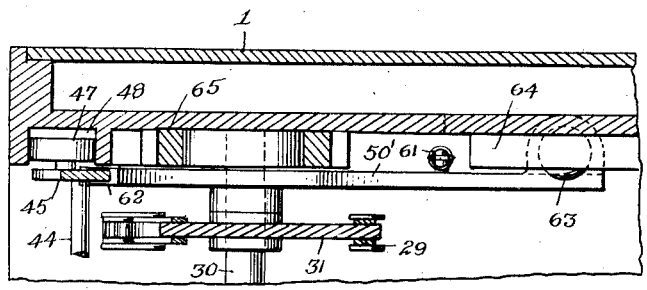
Fig. 14 is a fragmentary sectional view through Fig. 13 approximately on the line 14—14.

In Figs. 13 and 14 there is disclosed a modified form of stop or catch to the catch or pawl 50 shown in Fig. 3. In this form of the invention the respective runways 48' are not arc-shaped at the ends but are merely rounded at the corners. In this form of the invention instead of using pawl 50 there is provided a pawl 50' which is pivotally mounted on the shaft 30 and extends, when in functioning position, a short distance into the runway 48'. A retractile spring 61 is connected with pawl 50' and with a fixed member and continually tends to hold the pawl in the position shown in Fig. 13. However, when one of the plates 45 strikes the corner 62 it will spring the pawl 50' out of the way against the action of the spring 60. As soon as the plate 45 has passed, spring 61 will quickly function to move the parts to the position shown in Fig. 3. A rubber bumper 63 acts against the shoulder 64 carried by casing 1 to limit the spring movement of the pawl in one direction. This arrangement will function with practically no noise and the end of the pawl 50' will function to support the last set of plates 45 and the sign sheet carried thereby. When the parts are in the position shown in Fig. 3 and a new sign sheet is raised, the respective plates 45 will force the previous plates forwardly and the end of pawl 50' will engage the newly raised plates 45 and hold the same against return movement. This action is carried out successively as heretofore described with regard to Fig. 3.

Fig. 13 shows a modified chain support wherein the shaft 30 is supported by a sliding plate 65 adjacent each end thereof and each of these plates is provided with a pair of slots 66 through which clamping screws 67 extend. By this movement the respective chains 29 are maintained under proper tension.

In Fig. 9 a modified structure to that illustrated in Fig. 7 is presented. In this form of the invention the sign sheet 3 is looped over a rod 68 which is inserted into a cavity 69 through an opening 70. This cavity is formed by a rear plate 71 and a front plate 72 clamped together by suitable rivets 73. A suitable bore or opening 74 is provided for shaft 44 so that the shaft may freely rotate. A rod or round bar 75 is arranged in chamber 69 so as to prevent the looped end of the sign sheet 3 from moving out. This is another method of holding the sign sheet to the shaft 44 and is a modified structure to that illustrated in Fig. 8.

I claim:

1. A display device including a casing having a window, a pair of facing endless guideways arranged within said casing and on opposite sides of said window, a plurality of flexible sign sheets, means connected to one end of each of said sign sheets and so mounted as to be guided by said guideways whereby when the device is functioning said sign sheets will move in an endless path past said window, power driven means for intermittently moving said sign sheets past said window, and a suction chamber acting on the free ends of said sign sheets successively as they arrive at the bottom of the device for holding them against movement until said power driven means functions to move the sheets.

2. A display device including a casing having a window, a pair of endless guideways arranged in said casing and provided with straight sections on opposite sides of said window, a plurality of sign sheets, one end of each sign sheet being loosely positioned in said guideways, means for engaging and moving said sign sheets successively past said window, each of said sign sheets including a flexible body carrying matter to be displayed, a stiff heading for one end of said body, a pair of sleeves rigidly clamped respectively to said heading near the ends thereof, a shaft rotatably mounted in said sleeves, a rigid plate at each end of said shaft rigidly secured thereto, and rollers rotatably mounted adjacent each end of each of said plates, said rollers being mounted in said guideways for guiding the body as the sign sheet is moved.

3. A display device including a sign element formed with a flexible sheet body carrying matter to be displayed, a heading substantially U-shaped in cross section straddling one end of said body, a pair of tubular members near said heading, each of said tubular members having a bifurcated arm straddling said heading, means for clamping said arms to said heading, a single shaft rotatably mounted in both of said tubular members, a plate rigidly secured to each end of said shaft, and a pair of spaced wheels carried by each of said plates.

4. A display device including a casing having a window, a pair of endless tracks positioned in said casing provided with straight sections, one straight section being arranged on each side and near said window, a plurality of display units, each display unit having a flexible sheet provided at one end with means slidingly interlocking with said tracks, means for intermittently moving said display units along said tracks, means for holding each display unit stationary for a predetermined period after it has reached a position opposite said window, a continuously moving prime mover for actuating the first-mentioned means, and suction means acting on the free end of each of said sheets to yieldingly hold the sheets against movement as they are exposed through said window.

5. A display device including a casing having a window, a pair of endless tracks in said casing and positioned with certain sections arranged parallel to and adjacent the sides of said window, a plurality of display units, each of said display units having a free flexible end portion and a headed end provided with means slidingly guided by said tracks, a pair of spaced rollers at the top of said casing, a pair of spaced rollers at the bottom of said casing, said tracks being located so that the free flexible end portions will rest on all of said rollers in succession as they are moved along said tracks and means for intermittently moving the display units along said tracks.

6. A display device including a casing having a window, a pair of endless guideways, a plurality of flexible sign sheets, means secured to one end only of each sign sheet in said guideways for intermittently moving said sheets past said window, a pair of endless chains, each chain being provided with a special link having a projection, said projection functioning to engage one of said means at a time for moving the same and a sign sheet to a position opposite said window, means for causing said chains to move continually at a constant rate while the device is in operation, and suction means acting on the free ends of each sign sheet for yieldingly holding one sign sheet stationary as another is pulled thereover.

7. A display device including a casing having a window, a pair of facing endless guideways arranged within said casing and on opposite sides of said window, a plurality of sign sheets, a carrier connected to one end of each sign sheet, said carriers having the respective ends fitted within said guideways, a pair of driving chains for said carriers, each chain having a special link provided with an extension positioned to engage a carrier when at one point of its travel and move the same to a position opposite said window, said extensions engaging and moving the respective carriers in regular sequence as the chains continue to move, a catch for receiving and holding the carrier as the sign sheets are moved opposite said window, said guideways adjacent said catch extending away from said window, whereby said extensions as they move a carrier into engagement with said catch leave the carrier so that the sign sheet will remain stationary until the extensions move another carrier into engagement with said catch and the previous carrier to one step in advance thereof, means for driving said chains continuously, and means for yieldingly holding the free ends of said sign sheets as they are exposed through said window.

8. A display device including a casing having a window, a pair of facing endless guideways arranged within the casing on opposite sides of said window, a plurality of sign sheets, a carrier for each of said sign sheets, there being a carrier connected with one end only of each sign sheet, the ends of said carriers being slidingly mounted in said guideways, means including an endless chain having an abutment on one link for moving said carriers one at a time from a low point to a high point past said window so as to expose the sign sheets carried thereby through said window, a spring-pressed catch arranged at said high point for preventing the carriers from moving in a reverse direction, and power means for causing the moving parts of the device to function, said power means causing said chain to function and said abutment to move a carrier from said low point to said high point on each complete cycle of said chain.

9. A display device including a casing having a window, a pair of facing endless guideways arranged within said casing and on opposite sides of said window, a plurality of sign sheets, a sign sheet carrier secured to one end only of each sign sheet, means for moving said carriers from a low point in said guideways to a high point to expose successively said sign sheets through said window, suction means for yieldingly holding the free end of each sign sheet against moving after the sheets have been moved to a position to be exposed through said window, and a spring-pressed latch engaging each carrier immediately after it has been raised to prevent a reverse movement, each succeeding carrier as it is moved to be engaged by said catch functioning to push the next preceding carrier along said endless guideways.

10. A display device including a casing having a window, a pair of facing endless guideways arranged within said casing and on opposite sides of said window, a plurality of sign sheets, a plurality of carriers, there being one carrier connected to one end of each of said sign sheets, said carriers having the ends thereof extending into said guideways, there being enough carriers to fill said guideways except opposite said window, whereby there will be a tendency of certain of the sign sheets to be moved by the weight of the carriers to a position in front of said window, a latch adjacent the upper part of the window for preventing the respective sign sheet carriers from moving downwardly, a member adjacent the lower end of said window for preventing the sign sheet carriers from moving upwardly, and a power-actuated traveling member for simultaneously disengaging the first-mentioned member and engaging one of said sign sheet carriers for moving the same upwardly past said window and into interlocked relation with said latch.

JOB HUTCHINSON.